Nov. 5, 1929.  C. H. DOLAN, JR  1,734,159
MACHINE FOR TREATING THE TOPS OF PINEAPPLES
Filed Oct. 29, 1928
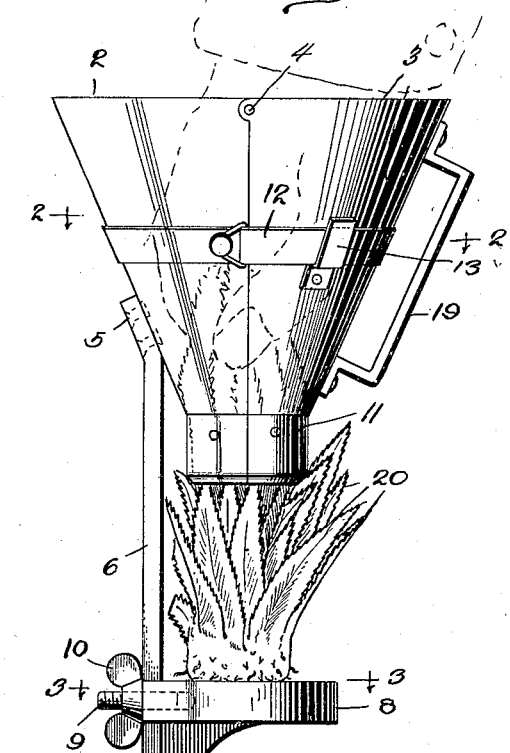
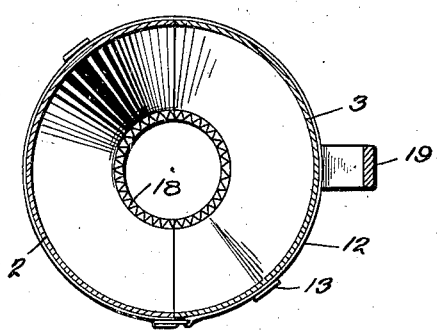
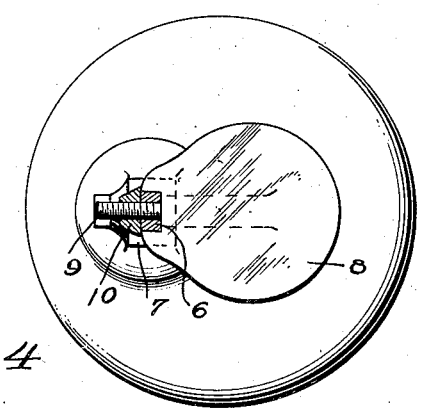
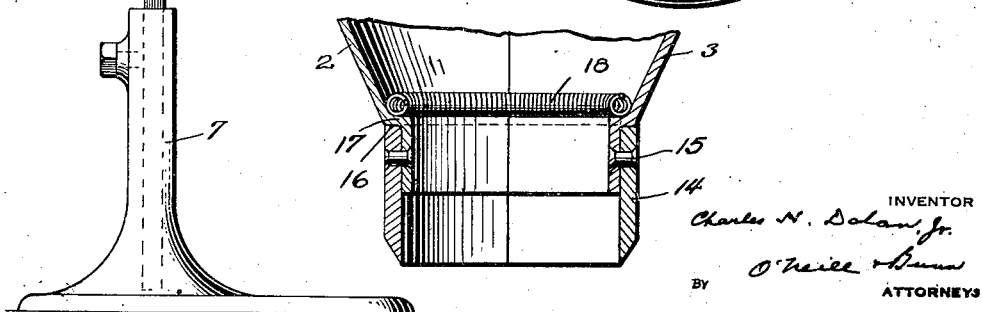
INVENTOR
Charles N. Dolan, Jr.
BY O'Neill & Dunn
ATTORNEYS Patented Nov. 5, 1929

1,734,159

UNITED STATES PATENT OFFICE

CHARLES H. DOLAN, JR., OF HONOLULU, TERRITORY OF HAWAII

MACHINE FOR TREATING THE TOPS OF PINEAPPLES

Original application filed January 14, 1928, Serial No. 246,798. Divided and this application filed October 29, 1928. Serial No. 315,794.

This invention relates to a machine for treating pineapple tops, slips, and shoots, and more specifically, to an apparatus for stripping the leaves from the lower portions of the tops, slips and shoots of pineapples, after the said tops, slips and shoots have been removed from the main body of the fruit.

It is to be understood that, in the pineapple industry of the present day, a very large proportion of the harvest is sent to the cannery, and subsequently shipped to the retailers. Immediately after the fruit is harvested, for canning purposes, the top of the pineapple is broken away from the body thereof. The main portion of the top so removed is called the crown, and comprises a fibrous growth carrying laterally extending leaves, the lower section of the said crown including a plurality of seed nodules which slightly project laterally of the body. The crowns are used as plantings for the future crop, and it is essential that the laterally extending leaves adjacent the seed nodules be removed so that said crowns may be easily inserted into the ground.

Prior to the development of the structure disclosed in my co-pending application No. 246,798, filed Jan. 14, 1928, it was customary to remove the leaves by manually pulling them off the crown, but, since the leaves are growths of great toughness, it is a very difficult operation to remove them as described. The leaves grow immediately adjacent the seed nodules, and the use of a cutting implement, in the hands of careless laborers, is likely to injure the nodules, and thereby render them ineffective from a productive standpoint. In removing the leaves by hand, to snap or tear them from the body of the crown, each laborer completely wears out a set of heavy gloves each day, and, even then, in many instances, the hands of the laborer are so cut and torn by the tough, cactus-like leaves, that continued work is often delayed.

The present application is a division of my co-pending application Ser. No. 246,798, filed Jan. 14, 1928, above referred, and the present invention comprehends the utilization of leaf removing operations which are part manual and part mechanical, as will hereinafter appear, the primary object of the invention being the provision of means for economically and quickly removing the leaves from the crown with a minimum amount of exertion by the operator.

Other objects of the invention will be made apparent in the accompanying specifications, when read in connection with the drawings forming a part thereof.

In said drawings:

Fig. 1 is a side elevation of an apparatus embodying my invention, illustrating one step in the leaf removing operation.

Fig. 2 is a section on the line 2—2 of Fig. 1.

Fig. 3 is a section on the line 3—3 of Fig. 1, and,

Fig. 4 is a vertical section taken through a portion of the lower end of the crown receiving hopper.

Now referring specifically to the drawings in which similar reference numerals indicate like parts throughout the several views, 1 indicates a funnel-shaped, open-mouthed hopper, composed of like sections 2 and 3, pivotally connected at the top at 4, said hopper being rigidly secured at 5, to an upright 6, mounted in a pedestal 7, and provided with means for adjustably regulating the height of the upright 6. A platform 8 is adapted to be adjustably secured to the upright 6, by means of a headed bolt 9 secured to the upright and extending through an elongated slot, or through any of a vertical row of apertures, not shown, the bolt 9 being adapted to a thumb screw 10, whereby to secure the platform in any adjusted position, dependent upon the length of the crowns being treated, as will be understood. The platform 8 is mounted directly below the mouth 11 of the hopper 1, as clearly indicated in Fig. 1, and is adapted to receive and support a crown passed through the hopper, as will hereinafter appear.

A resilient band 12, of rubber or of steel spring material, surrounds the sections 2 and 3 of the hopper 1, about midway of its vertical length, brackets 13 being provided to prevent vertical movement of the band 12, and a bi-furcated, circular cutter knife 14 is secured to the lower periphery of the hopper 1, by means of detachable bolts 15. A peripheral shoulder 16 is formed on the outer face of the lower end of the hopper 1, as clearly shown in Fig. 4, thereby forming a ledge 17, for the reception of a two-sectioned coiled spring 18 which rests thereupon and is secured thereto. A handle 19 is connected to the outer periphery of the section 3 of the hopper, adapted to be grasped by one hand of the operator during the operation of removing the leaves from the crown, to steady the device under such operation.

To remove the leaves 20 from the crown, the operator grasps the topmost leaves and, while holding the handle 19 with his left hand, he inserts the crown into the open top of the hopper 1, and forcibly pushes it downwardly until it rests upon or contacts the platform 8. Under pressure of the crown as it passes through the restricted lower portions of the sections 2 and 3, the section 3 is pushed outwardly against the resiliency of the band 12, the crown passing between the then widely spread sections of the knife 14, and the band 12 immediately restores the knife sections to the position shown in Fig. 1, the leaves 20 having sprung to the position also illustrated. When the operator feels the lower portion of the crown contact the platform 8, he immediately pulls the crown upwardly, preferably imparting a slight rotary motion thereto at the same time, and as the crown rises, the leaves 20 contact the edges of the knives 14 and are cut therefrom, the rotary motion of the crown permitting a shearing action on the leaves.

The coiled spring 18, resting upon and secured to the ledge 17, expands laterally with the spread of the knives as the crown passes through in each direction, and it is so positioned as to operate as a guard against the seed nodules of the crown coming in contact with the edges of the shoulders 17, to such an extent as to be liable to destroy the fertility of said nodules.

By the use of the device above described the operator may strip the leaves from many crowns in one minute, the knives operating automatically, and with greater safety to the seed nodules, as compared to the use of the customary chopping knife wielded by one hand of the operator while the crown is held by the other hand.

It is of course obvious that many equivalents of the band 12 may be substituted for the specific device here shown, and that various embodiments of the invention here described may be suggested to those skilled in the art. My invention however covers all modifications falling fairly within the scope of the appended claims.

I claim:—

1. A device of the character described comprising a support, a funnel-shaped hopper carried thereby and consisting of two-pivotally-connected sections each terminating at its lower end in a substantially semi-circular cutter knife, and means resiliently tending at all times to retain said sections in contact each to each.

2. A device of the character described comprising a support, a funnel-shaped hopper carried thereby and consisting of two pivotally-connected sections each terminating at its lower end in a substantially semi-circular cutter knife, means resiliently tending at all times to retain said sections in contact each to each, and a flexible guard member arranged horizontally with and immediately above the top of said cutter knives.

3. A device of the character described comprising a support, a funnel-shaped hopper carried thereby, consisting of two pivotally-connected sections each terminating at its lower end in a substantially semi-circular cutter knife, means resiliently tending at all times to retain said sections in contact each to each, and a coiled spring arranged horizontally with and immediately above the top of said cutter knives.

4. A device of the character described comprising a support, a funnel-shaped hopper mounted on said support and made up of two pivotally-connected, complementary sections, one of which is rigidly secured to said support, a cutter knife carried by the lower portion of each section, and means tending to draw said sections together.

5. A device of the character described comprising a support, a funnel-shaped hopper mounted on said support and made up of two pivotally-connected, complementary sections, one of which is rigidly secured to said support, a cutter knife carried by the lower portion of each section, means tending to draw said sections together, and a platform mounted on said support beneath said knives.

6. A device of the character described comprising a support, a funnel-shaped hopper mounted on said support and made up of two pivotally-connected, complementary sections, one of which is rigidly secured to said support, a cutter knife carried by the lower portion of each section, means tending to draw said sections together, and a platform adjustably mounted on said support beneath said knives.

7. A device of the character described comprising a support, a hopper mounted on said support and consisting of two relatively movable sections, a cutter knife carried by the lower portion of each of said sections, and means resiliently tending at all times to move one of said sections towards the other.

In testimony whereof I affix my signature.

CHARLES H. DOLAN, Jr.